United States Patent [19]

Narayanan

[11] Patent Number: 4,668,194
[45] Date of Patent: May 26, 1987

[54] MULTI-MODAL EDUCATIONAL AND ENTERTAINMENT SYSTEM

[76] Inventor: Sarukkai R. Narayanan, 2120 NW. 113th St., Oklahoma City, Okla. 73120

[21] Appl. No.: 825,059

[22] Filed: Jan. 31, 1986

Related U.S. Application Data

[63] Continuation of Ser. No. 695,870, Jan. 28, 1985, abandoned.

[51] Int. Cl.⁴ ............................................. G09B 7/00
[52] U.S. Cl. .................................... 434/338; 434/335; 364/709
[58] Field of Search ............... 434/335, 338, 340, 341; 364/709

[56] References Cited

U.S. PATENT DOCUMENTS 4,069,597 1/1978 Bigorre .............................. 434/340
4,505,682 3/1985 Thompson .......................... 434/335

Primary Examiner—Leo P. Picard
Attorney, Agent, or Firm—Bill D. McCarthy

[57] ABSTRACT

A multi-modal automated educational and entertainment device having improved functional versatility and which requires relational positioning of input data by the user which corresponds to required manual operations and procedures. The device comprises a tablet having a non-relational section for input of control or predefined information and at least one relational section for input of data, a stylus for activating the non-relational and relational sections of the tablet, a microcomputer logic unit for processing signals from the non-relational and relational sections of the tablet, and a memory unit for storing programs and data base for determining the accuracy or inaccuracy of the signals provided the microcomputer logic unit. Visual and audio outputs can also be provided for operator reinforcement and a power source for activating the device. A sequence of steps for operating the multi-modal automated educational and entertainment device under the control of stored programs is also provided.

4 Claims, 14 Drawing Figures

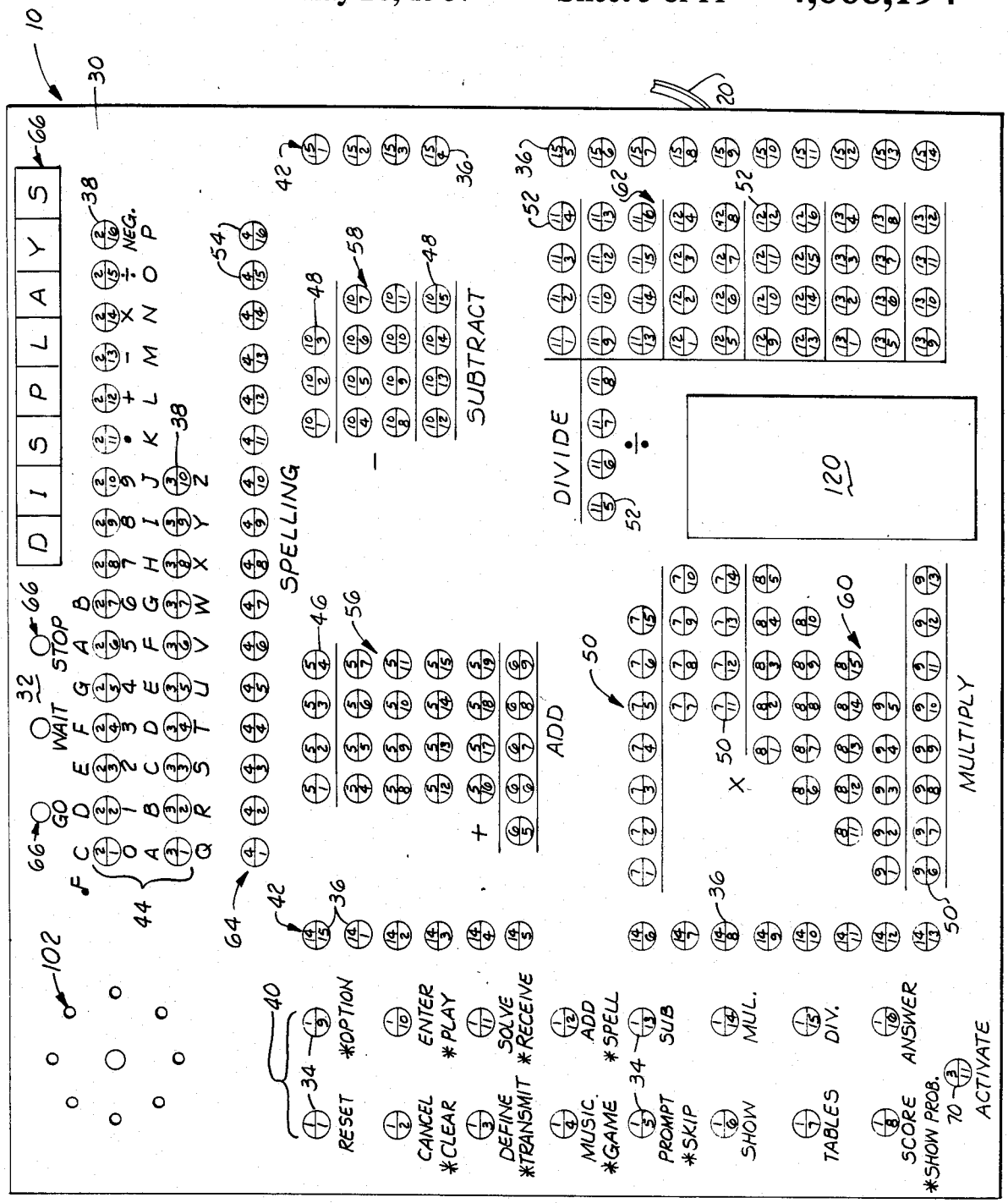

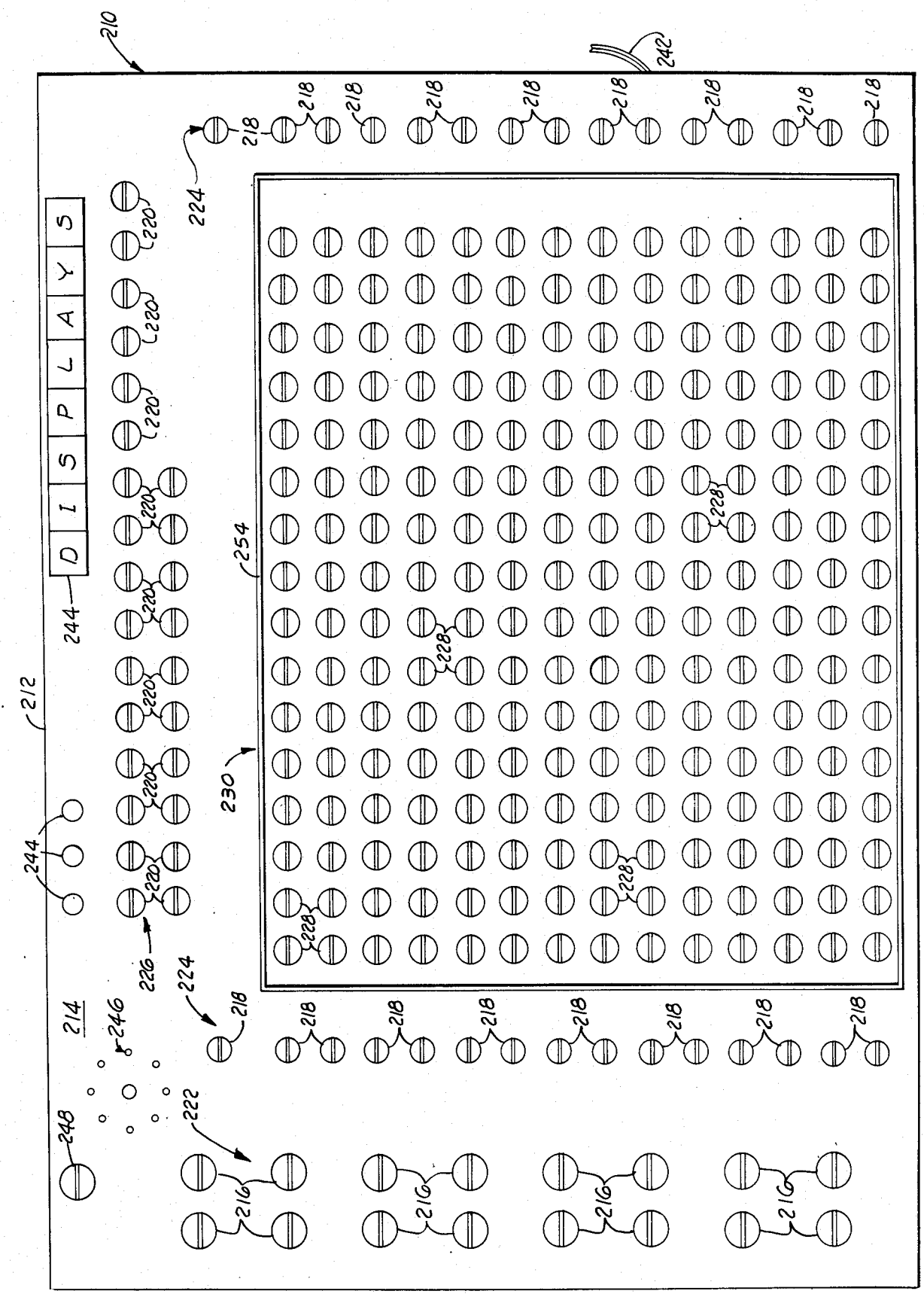
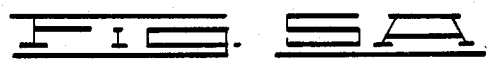

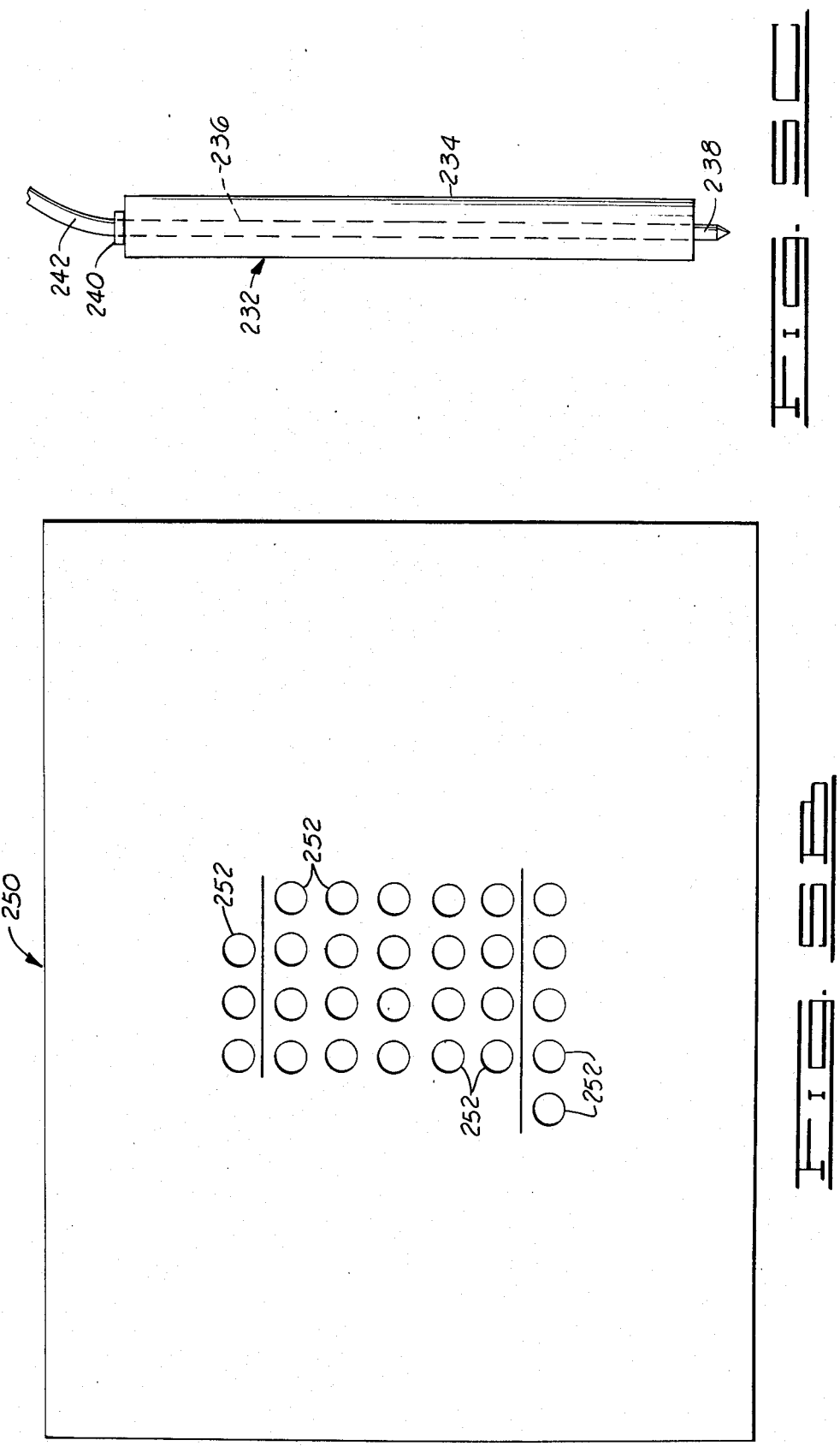

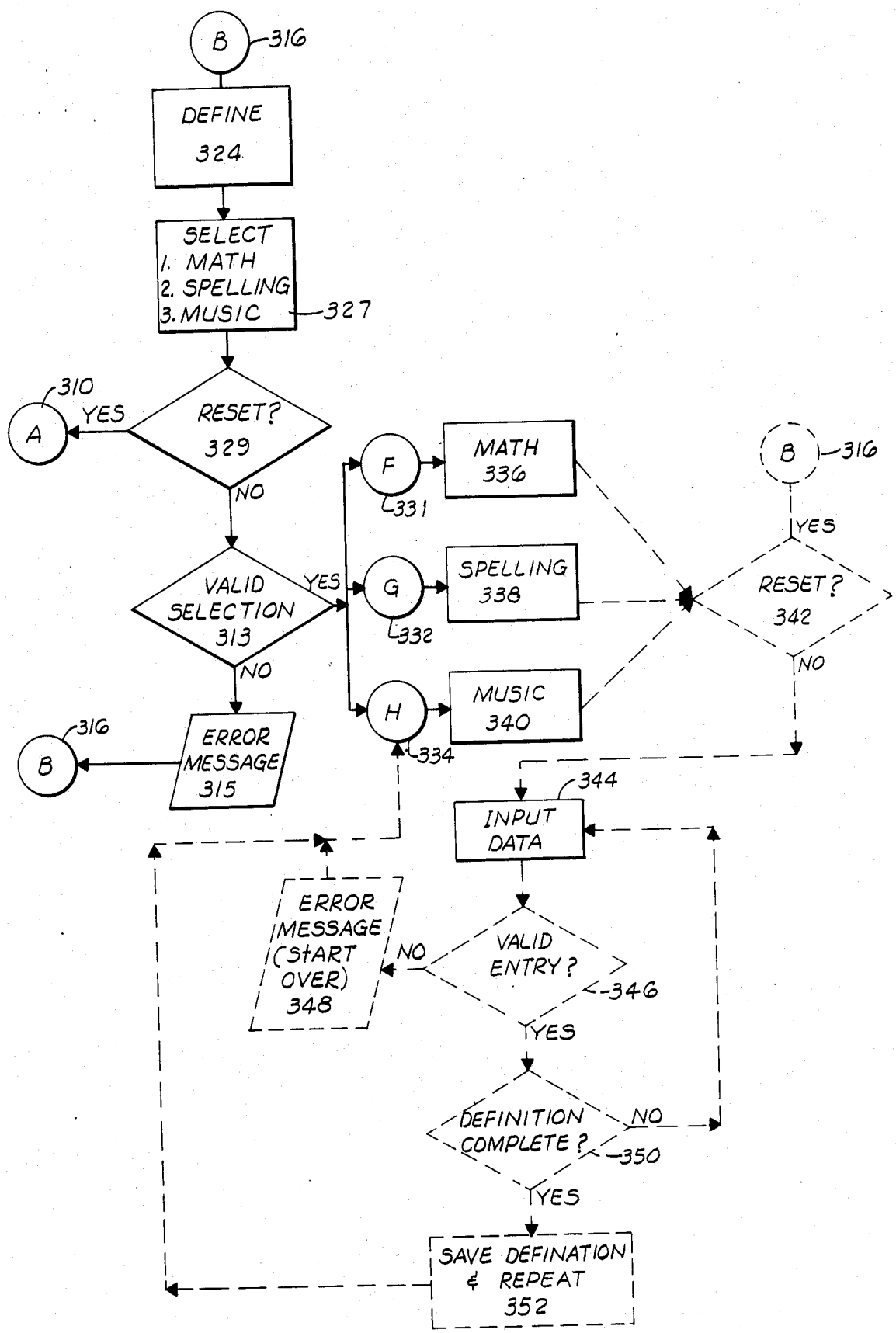

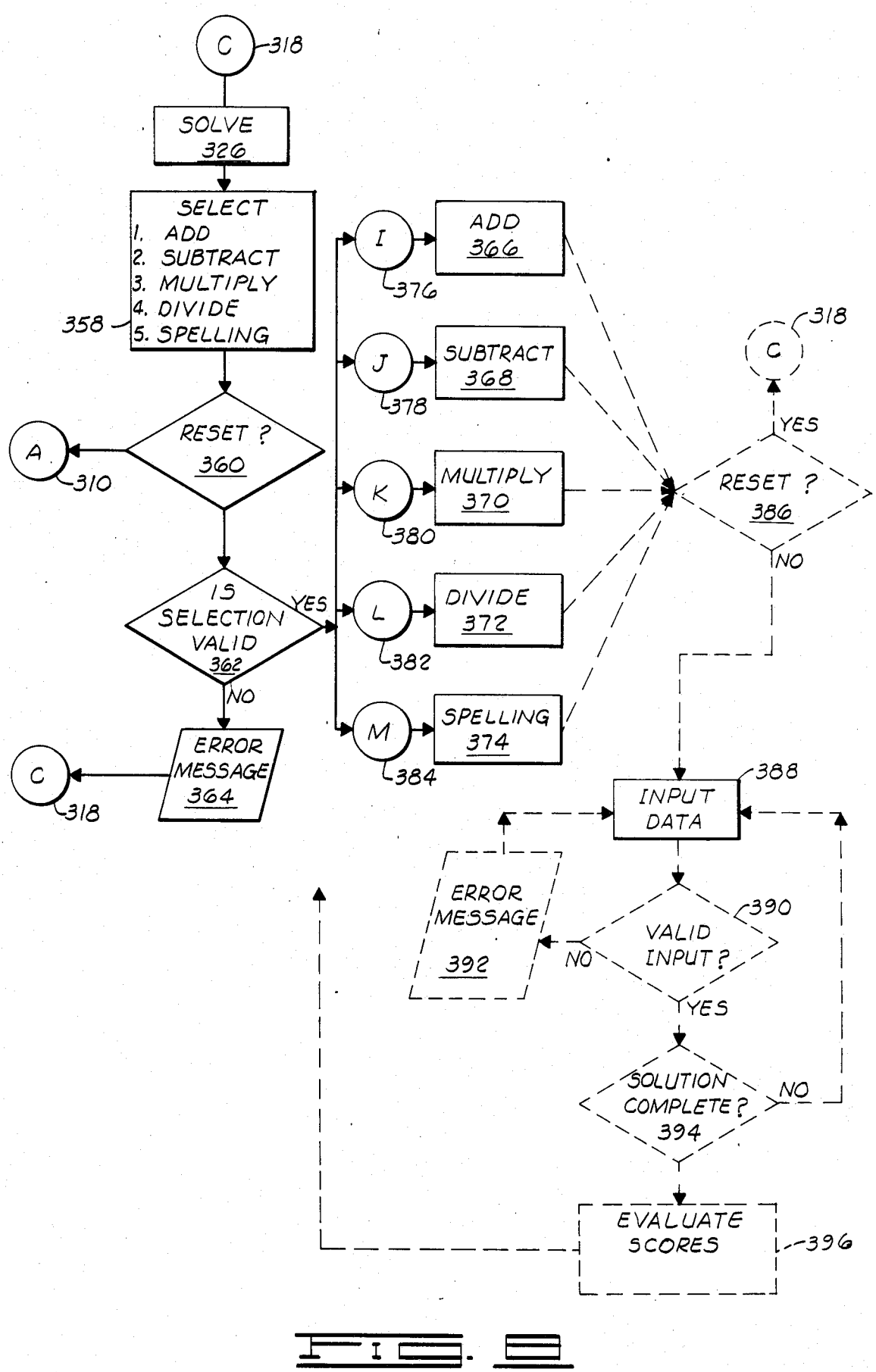

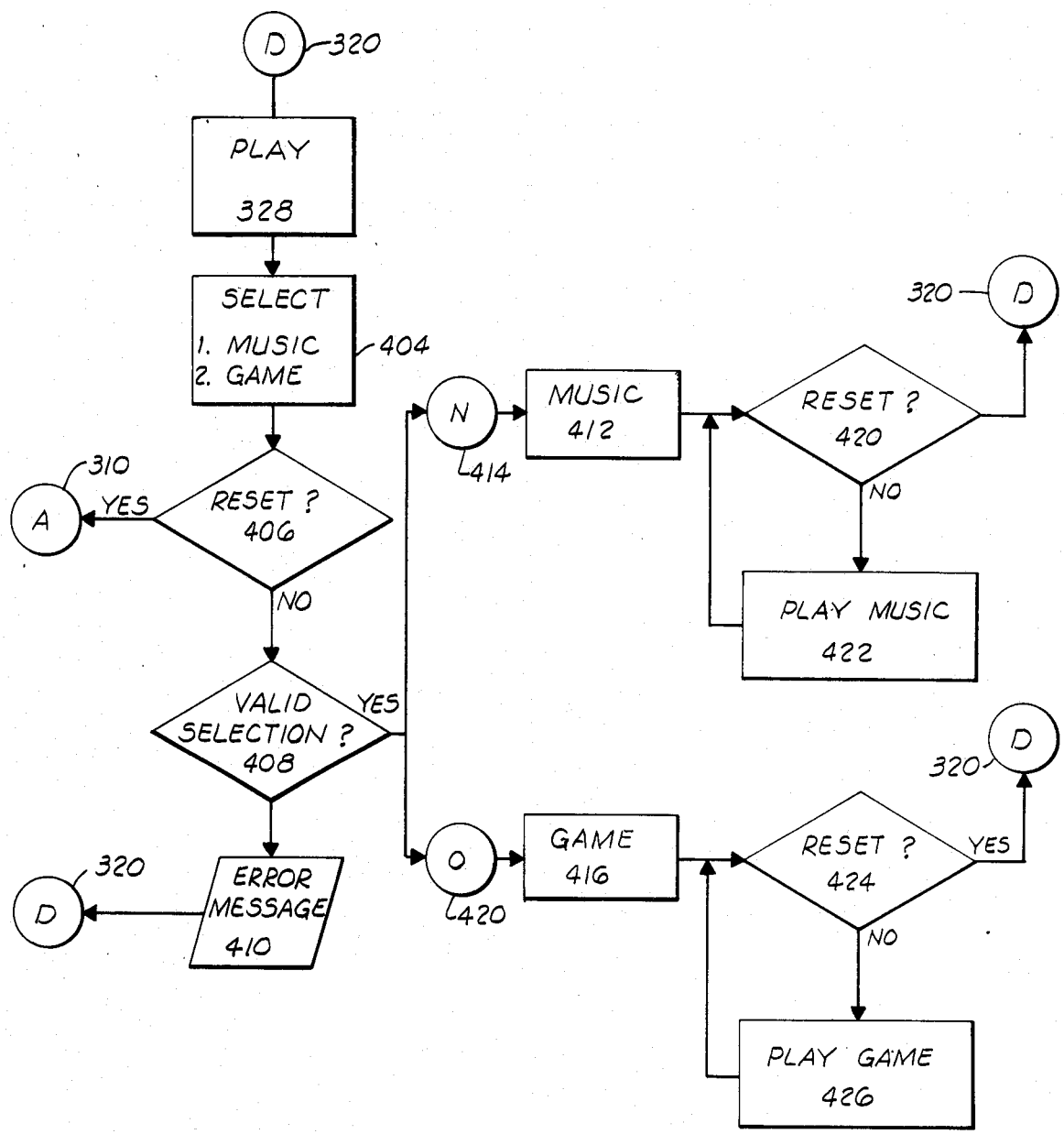

MULTI-MODAL EDUCATIONAL AND ENTERTAINMENT SYSTEM

This application is a continuation of application Ser. No. 695,870, filed Jan. 28, 1985, now abandoned.

BACKGROUND OF THE INVENTION

1. Field of Invention

The present invention relates generally to the field of computerized teaching systems, and more particularly but not by way of limitation, to an improved portable multi-modal automated educational and entertainment system.

2. Discussion of the Prior Art

Educational systems and devices have heretofore been proposed as teaching aids, such as for teaching multiplication tables and the like. The prior art systems and devices have generally been relatively simple with limited use capabilities and versatility, or extremely complex making it difficult for students and instructors to operate.

One prior art device (U.S. Pat. No. 3,009,262) with limited versatility comprises a light bulb carried on intersecting perpendicular rod members, the rod members being movable independently in two directions to locate the light bulb under an answer. The answer which overlies the positioned light bulb depends upon the distance the bulb is moved in perpendicular directions and indicates for example, the product of the numbers at their respective distances along the axes from the starting edges.

Another prior art device, taught in U.S. Pat. No. 3,771,240, comprises a card having interconnected conductive elements over which a second card is positioned, the second card defining selected mathematical problems and possible solutions. Probes are used to select the problems and their proper solutions. Light bulbs are engaged upon chosing a correct solution.

Still another prior art, disclosed in U.S. Pat. No. 3,834,042, teaches a computational device for teaching mathematics by means of an apparatus for indicating correct and incorrect solutions to an equation having two independent variables for selected variable values. The apparatus includes a printed circuit board and electrically conductive strips, the conductive strips forming a family of curves representing solutions to a desired equation of two independent variables. The family of curves is arranged in a manner so that the distance along one edge of the board represents the value of one of the independent variables, and the distance along another edge of the board represents the value of the other independent variable. The intersection of the lines parallel to the edges of the board intersecting over the curve represents the solution to the equation of the two variables. Each of the solution curves is connected to an electrically conducting possible solution marker displayed on the top panel. A test probe is connected to a relay switch to energize the relay when the test probe is brought into contact with the proper solution member to which the voltage is conducted from the solution curve. The test probe contains a switch operable by pressure on the probe to engage a selected one of the two solution indicating lamps, the incorrect lamp being ordinarily selected and the correct answer lamp being selected by positive potential being detected by the probe which the relay energizes.

U.S. Pat. No. 3,761,877 is representative of the more complex prior art systems and apparatuses, and is a system that utilizes a computer graphics input terminal comprising an optical or light position sensing device, a semi-transparent plate mounted in optical relationship to the sensing device, and a light-emitting stylus movable by the operator over the plate surface against the sensing device. The sensing device provides an analog output corresponding to the position of the stylus on the surface of the sensing panel and an analog to digital converter provides a digital output for feeding positional data to computers and/or other digital or analog operated equipment. This type of system utilizes a centralized computer and is not portable by its very nature.

Another type of character recognition system, disclosed in U.S. Pat. No. 4,184,147, utilizes the movement of a stylus across a predesignated data pad comprising three or more electrically conductive areas. As the stylus traverses the electrically conductive areas, a digital signal is produced which, when compared with a prestored table of characters, is either recognized or declared an input error. The signal is then transmitted to a computer or other device for processing.

Another type of prior art character recognition system, as disclosed in U.S. Pat. No. 3,835,453, provides for data input by a stylus that has a moving surface or ball, the stylus being constructed so as to produce a digital signal representitive of the movement of the surface or ball. The digital signal can be transmitted either by wire or RF transmission to a computer or other similar device whereupon it is decoded or recognized as a valid character or declared an input error.

Numerous other educational and character recognition systems and devices have been proposed. However, as with the before described prior art systems and devices, the other educational and character recognition systems and devices are inherently inflexible, substantially limited in function and versatility, or extremely complex in construction and operation. Thus, a need has long been recognized for automated teaching aids and/or entertainment systems which are portable, and yet have substantially unlimited versatility. Further, automated teaching aids are desired which require relational positioning of input data by the user substantially corresponding to manual operations and procedures in the solving of mathematical problems, spelling and the like.

SUMMARY OF THE INVENTION

The present invention relates to a multi-modal automated educational and entertainment device having improved functional versatility and which requires relational positioning of input data by the user which corresponds to required manual operations and procedures. Broadly, the present invention comprises a tablet having a non-relational section for input of control or predefined information and at least one relational section for input of data, a stylus for activating the non-relational and relational sections of the tablet, a microcomputer logic unit for processing signals from the non-relational and relational sections of the tablet, a memory unit for storing programs and data base for determining the accuracy or inaccuracy of the signals provided the microcomputer logic unit, visual and audio outputs for operator reinforcement and a power source for activating the device. In one aspect the present invention provides for a sequence of steps for operating the multimodal automated educational and entertainment device under the control of stored programs.

An object of the present invention is to provide an educational and entertainment device having improved functionality and versatility.

Another object of the present invention is to provide an educational and entertainment device which requires relational positioning of input data by the user that corresponds to required manual operations and procedures in solving mathematical problems and the like.

Still another object of the present invention is to provide a portable multi-modal automated educational and entertainment device suitable for use as a "standalone" unit or in combination with a master computer and a communication interface unit.

Another object of the present invention is to automate manual operations required in a classroom environment, thereby reducing the workload of a teacher in educating children.

Other objects, advantages and features of the present invention will become apparent to those skilled in the art from the following detailed description when read in conjunction with the drawings and appended claims.

BRIEF DESCRIPTION OF THE DRAWINGS

FIG. 2B is a top plan view of the multi-modal automated educational and entertainment device 10.

FIG. 6 is a logic and process flow diagram of the educational and entertainment devices illustrated in FIGS. 2 and 5.

FIG. 7 is a logic and process flow diagram of the "define function" of the diagram of FIG. 6.

FIG. 8 is a logic and process flow diagram of the "solve function" of the diagram of FIG. 6.

FIG. 9 is a logic and process flow diagram of the "play function" of the diagram of FIG. 6.

DESCRIPTION

Figure 1:
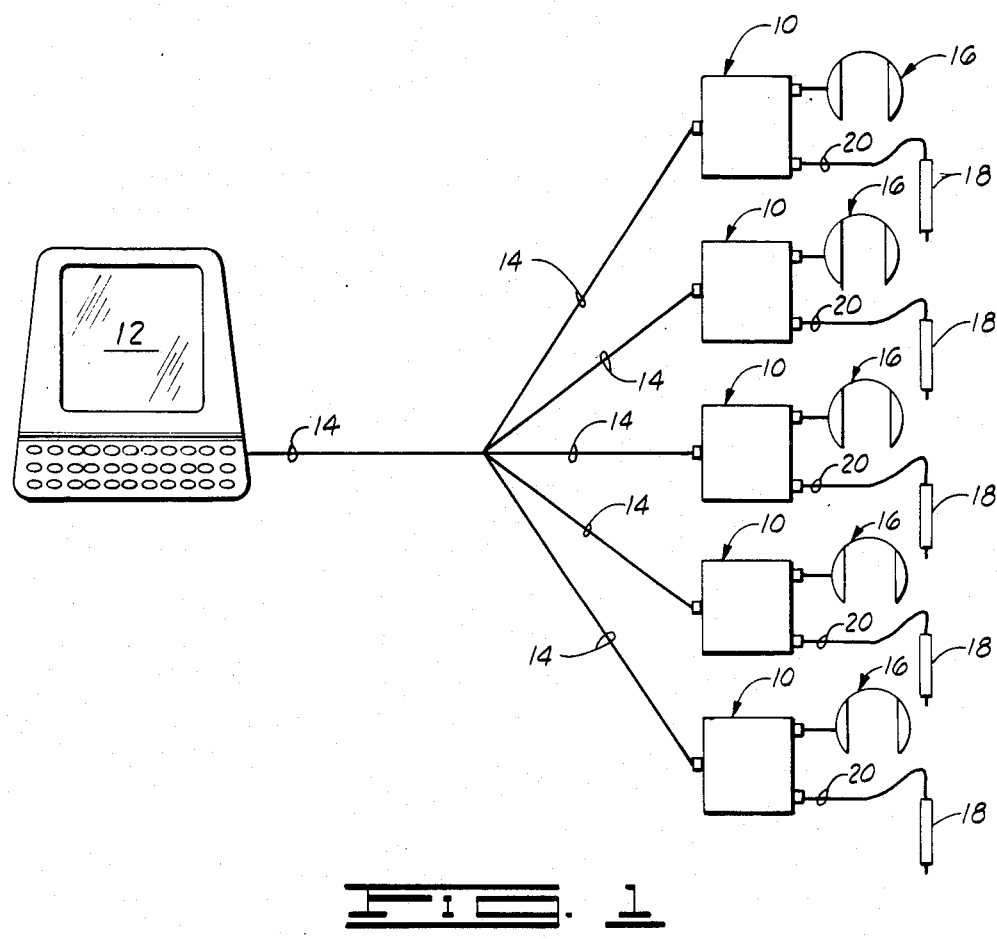
FIG. 1 illustrates in diagrammatical form a plurality of multi-modal automated educational and entertainment devices constructed in accordance with the present invention, each of the devices connected to a master computer via a communications interface unit.

Referring now to the drawings, and more particularly to FIG. 1, a plurality of multi-modal automated educational and entertainment devices 10 (hereinafter referred to as multi-modal devices) are connected to a master computer 12 by any suitable means, such as an RS-232C interface protocol represented by lines 14. Each of the multi-modal devices 10 is provided with a hearing device 16 and a stylus 18. The hearing device 16 can be any suitable unit known in the art such as a head phone, an ear plug, or a speaker. The stylus 18 can be a cognitive or non-cognitive device. The stylus 18 can be electrically connected to the multi-modal device 10 via line 20, as shown, by RF signals, or the stylus 18 can be independent of the multi-modal device 10 as will be more fully described hereinafter.

Figure 2A:
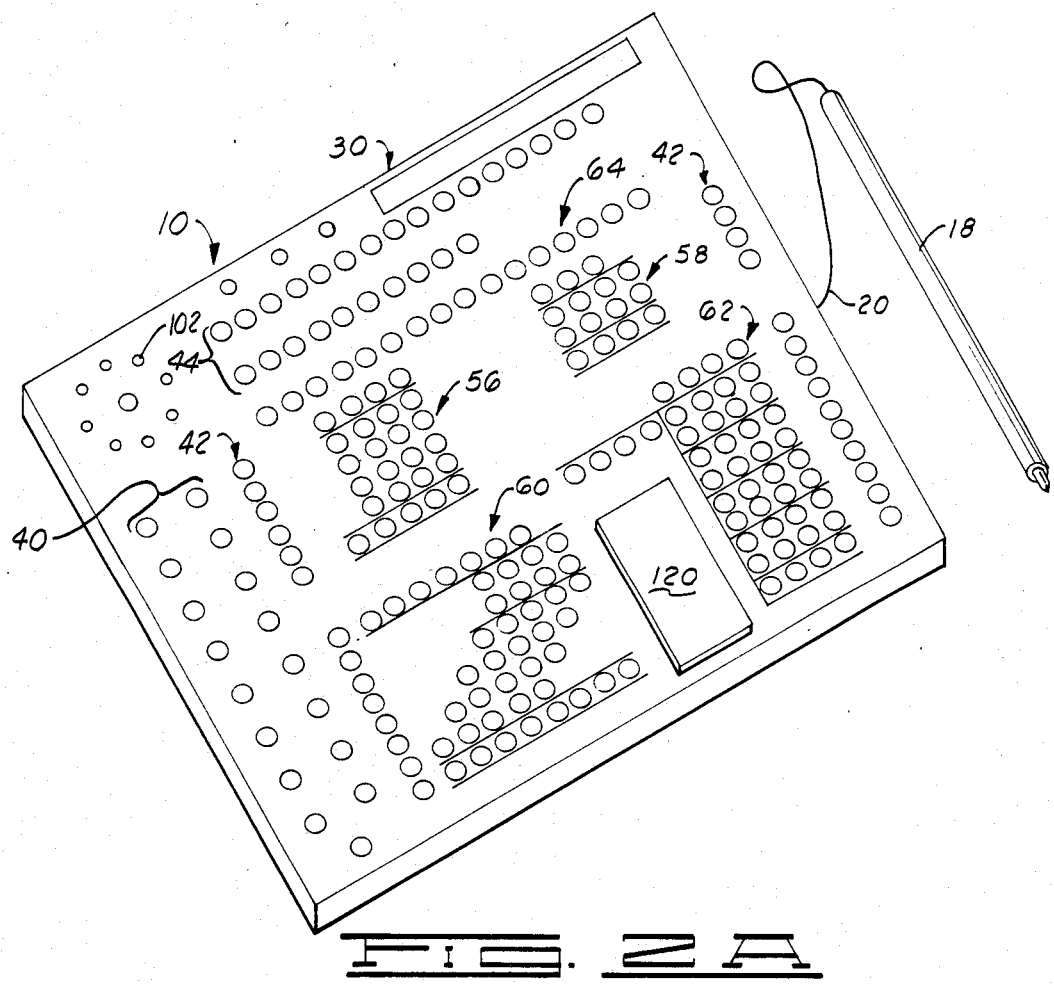
FIG. 2A is an isometric view of the multi-modal automated educational and entertainment device of the present invention, and illustrating a stylus for activating data input pads forming relational and non-relational sections of the device.
Figure 2C:
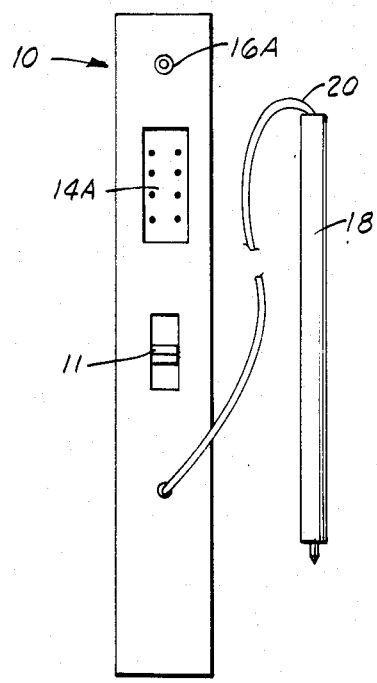
FIG. 2C is a side plan view of the multi-modal automated educational and entertainment device 10 showing the location of the earphone jack 16A, the input-/output jack 14A, on/off power switch 11, and the stylus.

Referring now to FIGS. 2A through 2C, the multi-modal device 10 comprises a housing 30 having an upper side 32. A plurality of input pads 34, 36 and 38 are disposed in predetermined portions of the upper side 32 of the housing 30 and form non-relational sections 40, 42 and 44, respectively. Similarly, a plurality of input pads 46, 48, 50, 52 and 54 are disposed on predetermined sections of the upper side 32 of the housing 30 and form relational sections 56, 58, 60, 62 and 64, respectively. The term "non-relational sections", as used herein, is to be understood to mean that there is no positional relationship between the input pads. The term "relational sections", as used herein, is to be understood to mean that there is a positional relationship betwen the input pads, such as would be true of the positions of digits in a mathematical problem, i.e. carrying digits, subtrahend, minuend and answer.

The input pads 34 and 36 which define the non-relational sections 40 and 42 of the multi-modal device 10, upon activiation by contact with the stylus 18, provide selected control signals to the multi-modal device 10 and thus to the master computer 12 (shown in FIG. 1); whereas the input pads 38 which define the non-relational section 44 of the multi-modal device 10, upon activation by contact with the stylus 18, provide cognition of predefined information to the multi-modal device 10 and thus to the master computer 12. Thus, the non-relational section 44 may be also referred to as a cognitive section. The visual marking, if any, accomplished by means of the stylus 18 on the input pads 34, 36 and 38 of the non-relational sections 40, 42 and 44 is inconsequential to the operation of the multi-modal device 10. The input pads 46, 48, 50, 52 and 54 defining the relational sections 56, 58, 60, 62 and 64 of the multi-modal device 10 are specifically used for the marking of symbols or information by means of the stylus 18. When the stylus 18 is brought into marking engagement with any of the input pads 46, 48, 50, 52 and 54 defining the relational sections 56, 58, 60, 62 and 64 of the multi-modal device 10, the activation of the input pad provides location indication signals to the multi-modal device 10, while the marking is indicative of the information associated with the particular input pad location.

The input pads 34, 36 and 38 in the non-relational sections 40, 42 and 44, as well as the input pads 46, 48, 50, 52 and 54 of the relational sections 56, 58, 60, 62 and 64 are shown as being made up of two half pads, each half-pad being numbered. All upper half pads bearing the same number are electrically connected together within the multi-modal device 10 and may be viewed in a logical sense as comprising rows. In the embodiment shown, there are therefore 15 rows numbered 1 through 15. Likewise, all lower half pads bearing the same number are connected together within the multi-modal device 10 and may be viewed in a logical sense as comprising columns. In the embodiment shown, there are therefore 16 columns numbered 1 through 16.

Figure 3:
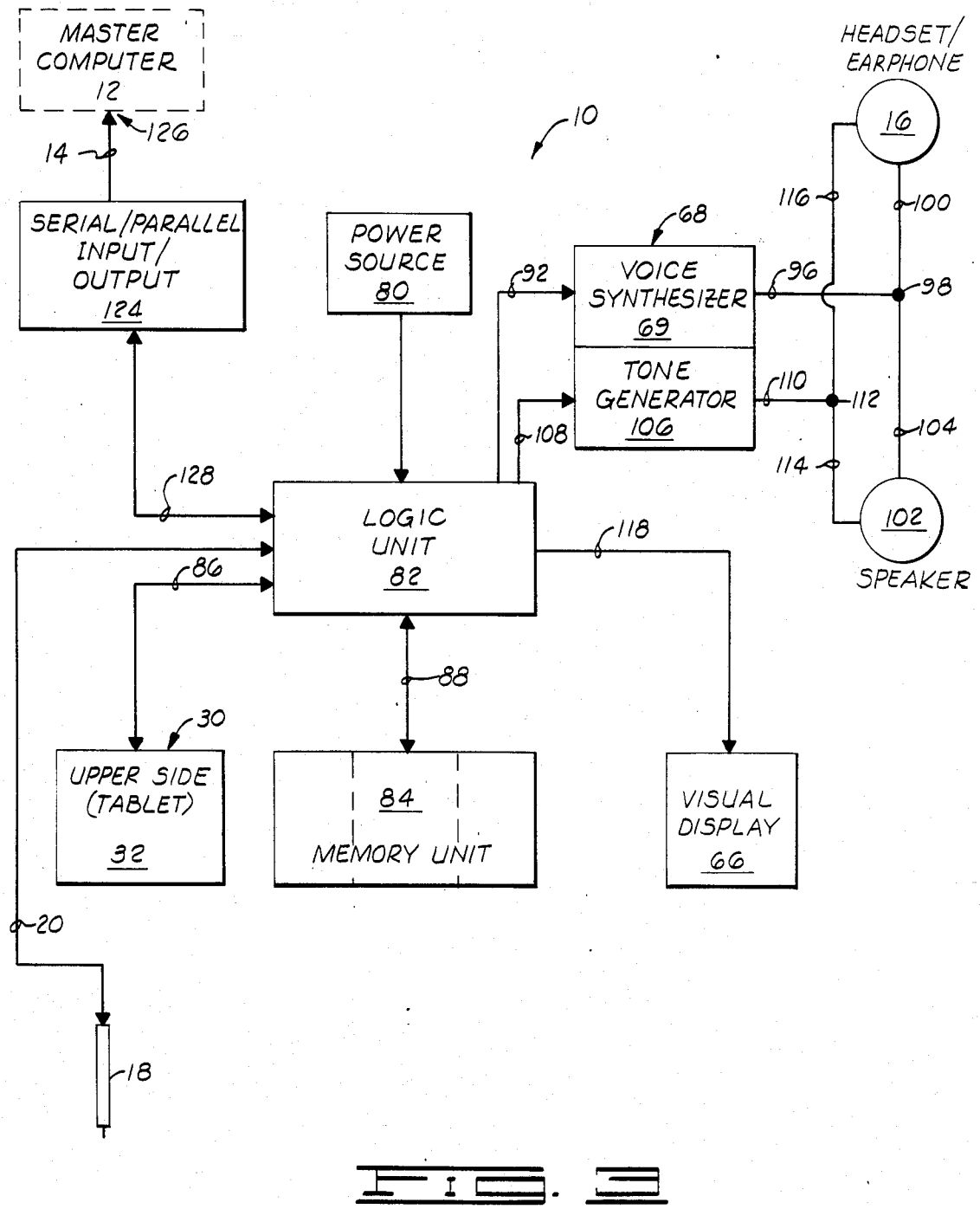
FIG. 3 is a block diagram of the educational and entertainment device of FIG. 2.
Figure 5:
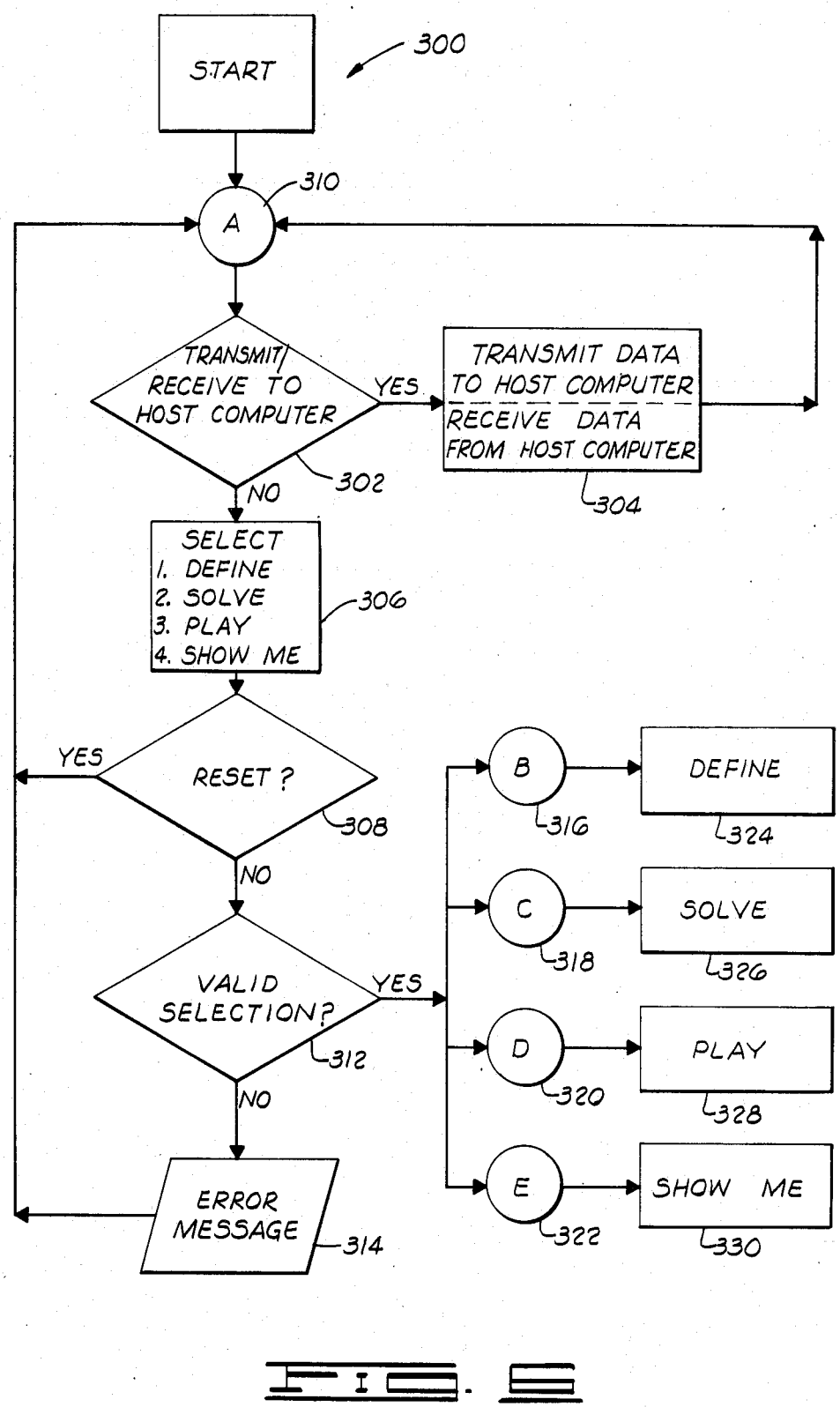
FIG. 5A is a top plan view of another embodiment of an educational and entertainment device constructed in accordance with the present invention, and illustrating a stylus for activating data input pads forming a relational section and a plurality of non-relational sections of the device, the device adapted to receive an overlay member for selectively providing access to a predetermined portion of the relational section of the device.
FIG. 5B is a top plan view of an overlay member for use with the educational and entertainment device of FIG. 5A.
FIG. 5C is an enlarged perspective view of the stylus 232.

As understandable by reference to FIG. 3, bringing the stylus 18 into contacting engagement with an upper half of an activation pad provides an input impulse to a logic unit 82 on the row of activation. When the stylus 18 is brought into contacting engagement with the lower half of an activation pad, this provides an input impulse to the logic unit 82 on the column of activation. Alternatively, the stylus being brought into stradling engagement with the upper and lower halves of any activation pad provides input impulse to the logic unit 82 on the row and column of activation. The logic unit 82 through its stored program is then able to identify the specific pad location of activation by the stylus 18 from the row and column input impulses received.

The multi-modal device 10 further comprises a visual display unit 66 aand a voice unit 68 (as shown in FIG. 3) which are used for positive and/or negative reinforcement to the operator of the multi-modal device 10. The visual display unit 66 comprises a plurality of lights and alphanumeric LEDs, LCDs or other display means well known in the art which will be described in more detail hereinafter.

In the operation of the multi-modal device 10, depending upon its design, certain information may not be input into the logic unit 82 via any of the input pads, such information none the less being important in the operation of the device. Provision by way of a scratch pad 120 is made for marking information, using the stylus 18, in order to facilitate the operator in remembering this information. The scratch pad 120 can be provided on the upper side 32 of the housing 30 of the multi-modal device 10. The scribing surface of the scratch pad 120 can be any suitable means which is capable of being marked upon with the stylus 18, when the stylus 18 is capable of producing a mark, such as a carbon core stylus or a stylus having a felt tip type pen. Further, the scribing surface of the scratch pad 120 should be capable of being easily cleaned by the user of the multi-modal device 10 when it is desired to remove any markings from the scribing surface of the scratch pad 120.

In a cognitive system wherein impulses from the stylus 18 are deciphered by the multi-modal device 10, misrecognition creates certain practical difficulties. In such an event, the indicia needs to be remarked with no guarantees that it will be properly recognized the next time. It is conceivable that while the above misrecognition was in progress, marking on another pad location had commenced leading to confusion as to how to operate the device in an orderly fashion. In one method, after completing the marking on a pad location, the operator pauses for a certain length of time until the system recognizes the written indicia and provides a visual or sound feedback to the operator indicative of a recognized input. In another case, after completing the marking on a pad location, the operator activates an activate pad 70 with the stylus to indicate completion of marking on any given relational pad. In either case, if the system misrecognizes the indicia, then instead of rewriting the indicia, the operator simply uses the stylus to activate the appropriate non-relational data input pad to "fix" the error and moves on to the next operation.

Referring now to FIG. 3, a block diagram of the multi-modal device 10 is illustrated. The multi-modal device 10, in addition to the input pads defining the relational and non-relational sections, and the stylus 18 as heretofore described, comprises a power source 80, a logic unit 82 and a memory unit 84. The power source 80 employed to electrically activate the multi-modal device 10 can be an internally disposed battery, such as a standard 9 volt rechargable battery, or the power source 80 may be a conventional receptacle for connection to an external power source. When employing an internally disposed battery as the power source 80 it is desirable to provide a step down transformer/converter so that the battery may be recharged when required.

When power is turned on, the signals received by the logic unit 82 via buss 86 is the result of activation of one or more pads on the upper side of tablet 32 by the stylus 18 in a pre-determined sequence. The logic unit 82 can be any suitable unit capable of carrying out the desired functions, such as a microprocessor. The logic unit 82 will process either control signals, location indication signals or data signals in accordance with its stored programs as will be more fully described hereinafter with reference to FIGS. 7, 8, 9, 10 and 11. Typical of a logic unit which may be employed in the multi-modal device 10 of the present invention is a microprocessor model 6502 CPU manufactured by Rockwell International, Inc.

The logic unit 82 is connected to the upper side (tablet) 30 via a bi-directional buss 86; and the logic unit 82 is connected to the stylus unit 18 via a bi-directional buss 20. The logic unit 82 is capable of controlling the voltage levels in the bi-directional buss 86 and the bi-directional buss 20. By first setting pre-determined voltage levels on the buss 36 and/or the buss 20, and then sensing the voltage levels on the buss 86 and/or the buss 20, the logic unit 82 is able to decipher the operation of the upper side (tablet) 30 and the stylüs unit 18. The impulses sensed by the logic unit 82 through the buss 86 provide location of pad activation information to the logic unit 82 while the impulses sensed by the logic unit 82 through the buss 20 provide the logic unit 82 with information on the location of pad activation and/or the symbol being marked on the input pad.

The memory unit 84 of the multi-modal device 10 is connected to the logic unit 82 via buss 88. The memory unit 84 stores programs, data base and temporary scratch pad memory, either singularly or in a plurality of non-volatile read/write memory, such as bubble memory, or volatile RAM (Random Access Memory) and/or ROM (Read Only Memory). Thus, the memory unit 84 provides an information signal to the logic unit 82 to compare with the input impulses received by the logic unit 82 from the activation of the relational and non-relational input pads of the multi-modal device 10.

The voice unit 68 is operably connected to the logic unit 82. The voice unit 68 may include a voice synthesizer 69 connected to the logic unit 82 via a buss 92. An output signal, representative of process data in the logic unit 82, is directed to the voice synthesizer 69 of the voice unit 68 via the buss 92, the process data being in the form of a signal used for both positive and negative reinforcement of the operator, as well as for prompting the user such as in the presentation of a spelling word and the like. Any suitable voice synthesizer well known in the art can be employed. The output of the voice synthesizer 69 can be delivered to the operator through a headset/earphone 16 via line 96, junction 98, and line 100. Alternatively, the output signal of the voice synthesizer 69 may be delivered to a speaker 102 via line 96, junction 98, and line 104. In addition to the voice synthesizer 69, the voice unit 68 comprises a tone generator 106. The tone generator 106 is connected to the logic unit 82 via a buss 108. The tone generator 106 generates a tone or tune which functions as positive and negative reinforcements for the operator of the multi-modal device 10. The output of the tone generator 106 can be delivered to the headset/earphone 16, via line 110, junction 112, and line 116, or the speaker 102 via line 110, junction 112, and line 114.

The visual display unit 66 of the multi-modal device 10 is connected to the logic unit 82 via a buss 118. The visual display unit 66 comprises a plurality of lights and alphanumeric LCDs (shown in FIG. 2), or suitable means which provide a visual readout of the signal transmitted to the visual display unit 66 from the logic unit 82. Thus, under program control, the logic unit 82 can produce the following: an output visual signal via buss 118 and the visual display unit 66; musical and other tone sounds via the buss 108, the tone generator 106, line 110, junction 112, and line 114 to the speaker 102, or via the buss 108, the tone generator 106, line 110, junction 112, and line 116 to the headset/earphone 16; speech or vocal sounds via the buss 92, the voice synthesizer 69, line 96, junction 98, and line 104 to the speaker 102, or via the buss 92, the voice synthesizer 69, the line 96, junction 98, and the line 100 to the headset/earphone 16. As previously stated, the visual display, the musical or other tone sounds, and the speech or vocal instructions can be either a positive or negative reinforcement to the operator of the multi-modal device 10, such depending upon the correlation between the data input into the multi-modal device 10 and the program data contained in the memory unit 84 of the multi-modal device 10.

The multi-modal device 10 as described above is a self-contained portable educational and entertainment systme capable of enabling the operator, such as a child, to carry out preprogramd functions. However, the capabilities of the multi-modal device 10 can be substantially increased, while still maintaining an individual unit even when a plurality of such units are used by a number of different operators, by interconnecting the plurality of the multi-modal devices 10 to the master or central computer 12 as illustrated in FIG. 1. In such instance, the logic units 82 of each of the multi-modal devices 10 has an integrated serial and/or parallel I/O (input/output) port 124 connected to port 126 of the master computer 12 via buss 14. The interconnection of the I/O port 124 of the logic unit 82 and the I/O port 126 of the master computer 12 allows transmission and receipt of control and input/output data in and from the master computer 12 to the logic unit 82 of each of the multi-modal devices 10 and vice-versa.

As shown in FIG. 2, the input pads 34, 36 and 38 of the respective non-relational sections 40, 42 and 44, the input pads 46, 48, 50, 52 and 54 of the respective relational sections 56, 58, 60, 62 and 64, and the activate pad 70 in the non-relational section 40 of the multi-modal device 10 can be of any suitable construction. Further, such pads can be constructed to be activated by pressure, light, heat or any other means known to the art. For example, if the input pads are activated by pressure the stylus 18 may be an ordinary pencil or pen which is not physically connected to the housing 30 of the multi-modal device 10. The relational and non-relational input pads, physically located on the upper surface 32 of the body portion 30, may be constructed variously such that they may be no more than demarcations, with switches, sensors or other means known to the are underneath them for detection of activation. Thus, the input data to the logic unit 82 via the input pads for the selection of thedesired functions, such as control, cognition input, display or the like, can be accomplished by either using the stylus or one of the operator's fingers to apply pressure to the required input pad in the predetermined non-relational section of the multi-modal device 10, while the pressure of marking indicia on the relational pads provide location indication impulses to the logic unit 82.

Figure 4:
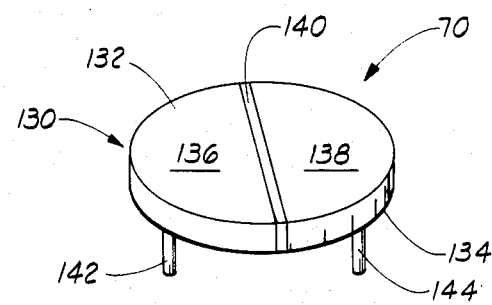
FIG. 4 is an enlarged perspective view of a data input pad, a plurality of which form the relational and non-relational sections of the device of FIG. 2.

While activation of the various pads of the multi-modal device 10 can be accomplished in several ways as described above, and the pads can be fabricated of various types of materials, configurations and designs, desirable results have been obtained when the input pads of the multi-modal device 10 are constructed as illustrated in FIG. 4. Since each of the input pads, i.e. the input pads forming each of the relational sections, non-relational sections, and the activate pad 70, are substantially identical in construction, only the activate pad 70 will be described in detail with reference to FIG. 4.

The activate pad 70 comprises a body portion 130 having an upper surface 132 and an opposed lower surface 134. The body portion 130, depicted as having a substantially circular configuration, is characterized as having a first half 136 and a second half 138. The body portion 130 is constructed of an electrically conductive material and an insulating medium 140, such as plastic, is disposed therein so that the first half 136 of the body portion 130 is electrically insulated from the second half 138 of the body portion 130. An electrically conductive lead or pin 142 is secured to the first half 136 of the body portion 130 so as to extend from the lower surface 134 of the body portion 130 substantially as shown. Similarly, an electrically conductive lead or pin 144 is secured to the second half 138 of the body portion 130 so as to extend from the lower suface 134 of the body portion 130 substantially as shown. Thus, in an assembled position of the activate pad 70 with the housing 30 of the multi-modal device 10 the leads or pins 142, 144 contact the electrical circuit contained within the housing 30 of the multi-modal device 10 such that electrical signals can be generated when the input pads, such as the activate pad 70, are activated by movement of the stylus 18 across the upper surface 132 of the body portion 130 heretofore characterized as the first and second portions 136, 138.

Any suitable electrically conductive material can be employed to fabricate the body portion 130 of the activate pad 70 and each of the input pads forminfg the relational and non-relational sections of the multi-modal device 10. Such materials are well known in the art and thus a further explanation of such materials is not believed to be necessary herein. Further, the upper surface 132 of the body portion 130 of the pads forming the non-relational sections 40, 42, and 44, as well as the activate pad 70 may be treated or finished such that marking by the stylus is minimized or inhibited. However, since indicia are marked on the pads forming the relational sections 56, 58, 60, 62 and 64, i.e., input pads 46, 48, 50, 52 and 54, respectively, the upper surface 132 of each of the input pads may be formed of a material for writing on with a carbon base tip or an ink bearing electrically conducting fiber tip. However, in such instances the upper surface 132 of each of the body portions of the input pads must be fabricated to facilitate being marked on as well as being capable of the operator erasing or removing the markings once the use for such markings as a means for visual recognition has ceased. It should be noted that while the activate pad 70 has been illustrated as having a circular configuration, the particular configuration of the activate pad 70, and each of the other input pads of the relational and non-relational sections of the multi-modal device 10 is not critical and can vary depnding upon the particular asthetic qualities desired in the overall appearance of the input pads and their relationship with the housing 30 of the multi-modal device 10.

The stylus 18 employed to activate the input pads of the multi-modal device 10 can be a non-cognitive unit or a cognitive unit. When employing a non-cognitive unit as the stylus 18 (as illustrated in FIGS. 1, 2, 3 and 5), the non-cognitive unit can be a carbon core pencil-like member, which may be electrically connected to the logic unit 82 via line 20 and the housing 30 of the multi-modal device 10. Optionally, the carbon core pencil-like member may be a stand alone unit, when it makes straddling engagement with the upper and lower halves of any pad. On the other hand, when employing a cognitive unit as the stylus 18, the cognitive unit may be constructed so as to provide indicia indicating signals to the logic unit 82 of the multi-modal device 10 via either an electrically conductive line or buss (represented by line 20 in FIG. 1), or RF signals. Any suitable cognitive unit can be employed as the stylus 18 of the multi-modal device 10. Typical of such a cognitive unit is the code generating and receiving apparatus disclosed in my U.S. Pat. No. 3,835,453.

The code generating apparatus of U.S. Pat. No. 3,835,453 the disclosure of which is hereby expressly incorporated by reference, is constructed such that a writing or marking can be made on the upper surface 132 of the relational input pads of the multi-modal device 10 so as to provide the logic unit 82 with input pulses indicative of the location where the marking was accomplished; and the apparatus simultaneoulsy generates and transmits indicia indicating signals to the logic unit 82 of the multi-modal device 10. The indicia indicating signals transmitted to the logic unit 82 are in the form of an indicia code representing the marked indicia.

In the use of prior art systems employing a cognitive unit, problems have been encountered in that the system may not recognize the character made by the cognitive unit. Upon completion of marking on an input pad of a relational section, the activate pad 70 may be activated, thereby providing input impulses to the logic unit 82 that recognition of the indicia code may be started. In the event of non-recognition of the indicia indicatinfg signals from the code generating apparatus by the logic unit 82 of the multi-modal device 10, the operator contacts the code generating apparatus with the appropriat input pad of a predetermined non-relational section so that data represented by the activation of the input pad is entered into the logic unit 82 to correspond to the marked indicia which was misrecognized.

Referring now to FIG. 5A, a second embodiment of a multi-modal device 210 is illustrated. The multi-modal device 210 is illustrated. The multi-modal device 210 comprises a housing 212 having an upper side 214. A plurality on non-relational input pads 216, 218 and 220 are disposed in predetermined portions of the upper side 214 of the housing 212 and form non-relational sections 222, 224 an 226, respectively. Similarly, a plurality of relational input pads 228 are disposed on the upper side 214 of the housing 212 and form a relational section 230. The non-relational input pads 216, 218 and 220, which define the non-relational sections 222, 224 and 226 of the multi-modal device 210, upon activation by contact with a stylus 232, provide selected control and data input signals to the logic unit 82 of the multi-modal device 210 and thus to a master computer 12(shown in FIG. 1); whereas the relational input pads 228 which define the relational section 230 of the multi-modal device 210, upon activation by marking engagement of the stylus 232, provide location data to the logic unit 82 of the multi-modal device 210 and thus to the master computer 12. The input pads 228 of the relational section 230 are interconnected in rows and columns such that location data input is transmitted to the logic unit 82 in the multi-modal device 210 for processing as heretofore described with reference to the multi-modal device 10.

The stylus 232, shwon in FIG. 5C, includes an elongated housing 234 which may be gripped by the human fingers and a centrally disposed core 236 having a first end 238 and an opposed second end 240. The stylus 232 can be an independent element, or the stylus 232 can be electrically connected to the logic unit 82 of the multi-modal device 210. For example, an electrically conductive line or element 242 can be employed to interconnect the second end 240 of the core 236 of the stylus 232 to the logic unit 82 via the housing 212 of the multi-modal device 210 so that an electrical potential can be established therebetween.

The first end 238 of the core 236 extends outwardly from the elongated housing 234 of the stylus 232 and forms a tip portion. The core 236 can be formed of a material capable of making a visible marking on the relational input pads contacted, or may be constructed of a non-marking material. A typical example of a material suitable for use as the core 236 of the stylus 232, which is capable of making a visible mark on the relational input pads, is carbon; whereas an example of an non-marking material which can be employed as the core 236 of the stylus 232 is a steel rod.

The multi-modal device 210 further comprises a visual display 244, a speaker 246 and an activate pad 248. The visual display 244 and the speaker 246 are employed to provide visual and sound signals for positive and/or negative reinforcement to the operator of the multi-modal device 210 in the same manner heretofore described with reference to the multi-modal device 10. The activate pad 248, which upon activation produces a signal to the logic unit 82 contained in the housing 212 of the multi-modal device 210 so that the logic unit 82 can receive and recognize the stylus signals, is similar in contruction and function to the activate pad 70 of the multi-modal device 10 heretofore described in detail. Therefore, no further description of the visual display 244, the speaker 246 or the activate pad 248 is believed necessary.

The multi-modal device 210, in addition to the logic unit 82 further comprises a power source 80 and a memory unit 84, each of which is identical in construction and function to the power source 80, the logic unit 82 and the memory unit 84 of the multi-modal device 10 heretofore described in detail with reference to FIG. 3. Therefore, a detailed description of such components with reference to the multi-modal device 210 would be redundant and is not believed necessary for one to fully understand the construction and operation of the multi-modal device 210.

Referring now to FIGS. 5A and 5B, the multi-modal device 210 fruther comprises a plurality of overlay members 250, (only one being illustrated in FIG. 5B) each of the overlay members 250 having predetermined openings 252 therein so that a selected portion of the input pads 228 defining the relational seciton 230 of the multi-modal device 210 can be selectively exposed to the operator via the openings 252 while the remaining input pads 228 are covered by the overlay member 250 an thus not available to the operator as long as the overlay member 250 is maintained in position on the upper side 214 of the housing 212. For example, the overlay member 250 depicted in FIG. 5B is provided with a plurality of openings 252 in an appropriate location so that when the overlay member 250 is positioned on the upper side 214 of the housing 212 the input pads 228 of the relational section 230 defining an "add" functon of the multi-modal device 210 are positioned within the same opening 252. By the use of a different mask, the same relational pads may be used for performing other functions, the mask providing the window for selectively exposing and bringing into relational positioning the "free form" pads for accomplishing the desired function. While the overlay member 250 has been illustrated as containing a plurality of openings 252, it is readily apparent that the overlay member 250 can be provided a single opening of a predetermined size and shape required to expose the preselected input pads 228 of the relational section 230 defining a particular function.

The overlay member 250 can be formed of any suitable material. However, it is preferable that the overlay member 250 be formed of a thin sheet of durable, flexible material so that the overlay member 250 can be used a number of times. Thus, desirably the overlay material will be formed of a plastic or heavy duty paper material.

Numerous methods can be employed to secure the overlay member 250 in a stable position on the upper side 214 of the housing 212 to insure that the proper input pads 228 are exposed via the openings 252 formed in the overlay member 250. The particular method employed will be dependent, to a large degree, upon whether the input pads 228 of the relational section 230 are substantially flush with the upper side 214 of the housing 212, as shown in FIG. 5A, or are in a raised position above the upper side 214. As shown in FIG. 5A, ridge assembly 254 is disposed on the upper side 214 of the housing 212 so that the ridge assembly 254 encompasses the input pads 228 of the relational section 230. The ridge assembly 254 can be a continuous segment, as shown, or can be a plurality of intermittant segments disposed around the periphery of the relational section 230.

The process of implementing the muti-modal devices 10 and 210 are substantially identical. Thus, the process of implementing the multi-modal device 10 will be described in more detail with reference to FIGS. 6-10 of the drawings.

FIG. 6 illustrates a process 300 for selecting the various functions that are available on the multi-modal device 10. In carrying out the process a sequence of steps and decisions are required, the first step requires a decision of whether or not to transmit or receive data or control signals from the host or master computer as shown in block 302. If a "yes" decision is made at this particular point, block 304 is invoked which will either allow the transmission or receipt of data and/or control signals to/from the host computer by means previously described herein. If a "no" decision is made, one of the four functions represented by block 306 is selected by activation of the appropriate input pads. The particular selection may be made to proceed to a "define", "solve", "play" or "show me" mode. The next decision is to determine whether or not to "reset", in the event that an erroneous signal has been entered. The "reset" is represented by block 308. If "reset" is selected a signal is fed to connector "A", represented by block 310, and the selection process is restarted from the input connector "A". On the other hand, if the reset is not activated a signal is directed to block 312 for a determination as to the validity of the selection. If a valid selection has not been made, a signal representing an error message would be produced in block 314 and a signal directed to connector point "A", block 310, to restart the procedure. If a "correct" selection has been made a signal is directed to one of four possible connector "B", "C", "D" or "E", represented by the blocks 316, 318, 320 and 322, respectively, whereupon the signal would proceed to one of the following blocks, namely: a "define" block 324, a "solve" block 326, a "play" block 328, or a "show me" block 330.

FIG. 7 illustrates the "define" function of FIG. 6 and the procedures involved therein. The "define" function is accomplished via signal input through connector "B" represented by the block 316. The "define" function is represented by the block 324 and in operation the operator decides what to do within that function. Block 327 provides for th selection of the following; (1) math problems, (2) spelling, or (3) music. Upon selection of one of the above functions the process allows the operator one of two options at block 329, either to "reset" or to proceed to the next part of the process. In the event of "reset" is selected, a signal is directed to connector "A", block 310. If not "reset", a signal proceeds to a valid selection block represented by the numeral 313 where a determination is made whether the signal represents a valid selection. If the signal represents an incorrect selection the operator is given an errror message represented by block 315, and the signal would proceed to connector "B", block 316 and the process would be repeated. If the signal represents a valid selection the signal proceeds to one of three connectors "F", "G", or "H", represented by the blocks 331, 332 and 334, respectively. These blocks allow the process then to continue, in the case of connector "F", block 331, to mathematical operation represented by block 336; in the case of connector "G", block 332 to spelling operations represented by block 338; or in the case of connector "H", block 334, to music operations represented by block 340. Upon selection of one of the three possibilities, i.e. math, spelling or music, an option to reset is provided represented by block 342 to allow for reselection if needed. If the reset function is not involved, the process proceeds to block 344 for data input and then onto block 346, a valid entry decision block. If an invalid entry was made, the signal would continue to block 348 whereupon an error message would be produced and the signal would proceed back to the connector "F", "G", or "H" depending upon where the process originated from. If a valid entry was made, the signal would continue onto block 350 where a determination would be made as to whether or not a definition had been completed. If the definition had not been completed, additional input of data is entered by repeating the process through block 344. If the definition had been completed, the process would store the definition of the problem in the block represented by the numeral 352. Upon storage of the definition of the problem, the process would be repeated through whichever connector the process started until the definition process is completed. As detailed hereinabove, connector "F" starts an example of a mathematical problem definition process. The procedure would be followed in the same manner in each of the three blocks whether it was connector "F" for math, connector "G" for spelling, or connector "H" for music.

The solve function flow process of the multi-modal device 10 is illustrated in FIG. 8. An input signal is received through connector "C", represented by block 318, and the signal is directed to solve block 326. In this instance one of five possible functions represented by block 358, namely, add, subtract, multiply, divide or spelling may be selected. Upon selection of one of the five functions, an opportunity is provided to "reset" if an error has been made. The "reset" is represented by block 360. When it is determined that an input error has been made, and the reset activated, a signal is directed to the connector "A" represented by the block 310. If the input is proper, the signal is continued to block 362 for determination of whether the signal represents a valid selection. Two occurances can happen in block 362. If the selection was invalid, a signal is produced to generate an error message, represented by block 364, and the signal would proceed through connector "C", i.e., block 318. On the other hand, if the selection was correct, a signal is provided to one of five selected functions, namely add, subtract, multiply, divide or spelling, represented by the blocks 366, 368, 370, 372 and 374 via connectors "I", "J", "K", "L" or "M", represented by blocks 376, 378, 380, 382 and 384, respectively. Upon selection of any one of these five functions a determination as to whether or not a "reset" is necessary, and in the event of an input error, the selection can be reset via reset block 386. If "reset", a signal is passed to connector "C", represented by the block 318 so that another selection could be made. For example, if doing an add function and the subtract function was input, the process could be "reset" and the correct add function input. If the correct function has been input, and the process not "reset", a signal is directed to block 388 for input of data; and then into block 390 where a determination of the validity of the entry is made. If the entry is invalid, a signal is directed to block 392 where an error message is produced, and the signal representing the error message is directed back to block 388 so that new data can be input. The signal representing the new input data would again be directed to block 390 for determination as to whether or not a valid entry had been made. In the event that an entry was valid, a signal representing the valid entry would continue to block 394 where a determination would be made as to whether or not the solution was complete. If the solution is not complete, in that the solution required more steps, a signal would be passed back to block 388 for input of additional data. If the solution is completed, a signal is generated which is passed to block 396 where the signal representing the answer is evaluated with stored data to determine whether or not it was correct.

The process would continue by providing a signal from block 396 to the connector from which the process originated, such as the connector "I" if the "add" function being processed. The above described process could be followed for any one of the five possible functions, namely add, subtract, multiply, divide or spelling.

FIG. 9 illustrates a flow diagram of the "play" mode of the multi-modal device 10. A signal, representative of the "play" mode is entered in connector "D" represented by the block 320 and passed to the "play" mode represented by block 328. From block 328 the signal is directed to block 404 where a dicision is made by the operator to play music or a game. Once the proper selection of the "play" mode has been made, a signal representative of the selection is passed to block 406. At this time the operator determines whether to reset the process or continue on. If the process is reset because the operator does not wish to proceed, a signal is generated via block 406 and directed to connector "A", represented by the block 310. If the process was not reset, a signal is advanced to block 408 where the signal is compared to determine if a valid selection was made. If the input signal is determined to be incorrect, the signal representing such a determination is supplied block 410 where a signal representing an error message is produced and fed connector "D", represented by the block 320. If the signal received by the block 408 represents a valid selection, a signal is generated and directed to either block 412 via connector "N" represented by the block 414 or to block 416 via connector "O" represented by the block 420. Connector "N" is used for music selection as shown by block 412; and connector "O" is used for game selection as shown by block 416. If the operator had selected the music mode, the operator would have the option to either continue or "reset" by activation of a reset mechanism represented by block 420 so as to provide a signal to connector "D", represented by the block 320. If "reset" was not necessary a signal would be passed from block 420 to a "play music" block 422, whereupon the multi-modal device 10 would play music. If the selection had been made to play a game, a signal would proceed from connector "O", represented by block 420, to the game block 416, whereupon the operator could make the selection to either continue or reset by activation of a reset mechanism represented by the block 424 so as to provide a signal to connector "D" represented by the block 320. If the "reset" had not been selected a signal would be passed from block 424 to a "play game" block 426 whereupon the multi-modal device 10 would play a game as preselected. In either of the above selections the device 10 would either play music or play a game and would continue until the completion of the music or the game, whereupon it could be "reset" and go to connector "D" represented by block 320, or continue to play other music, tunes or games.

Figure 10:
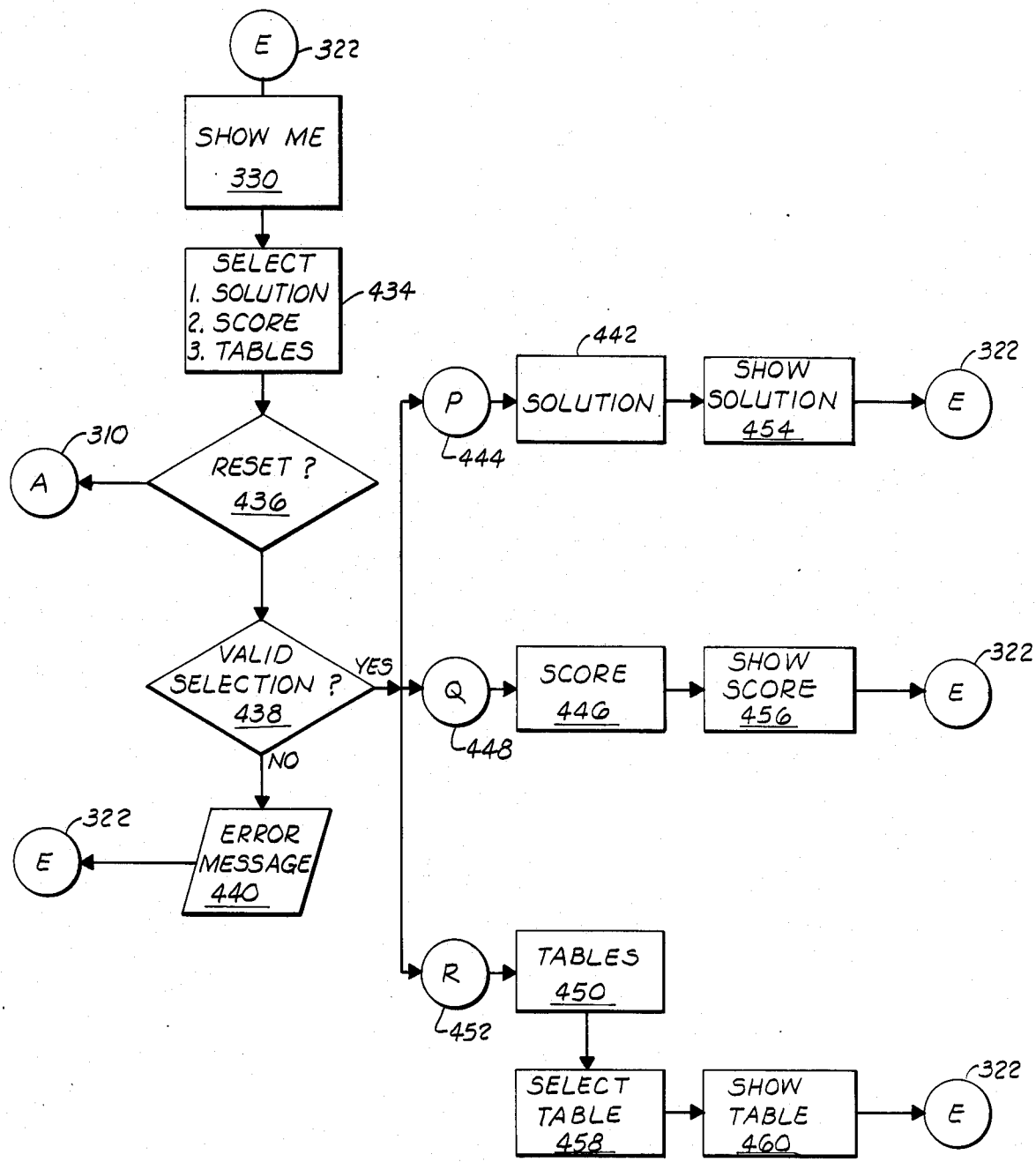
FIG. 10 is a logic and process flow diagram of the "show me function" of the diagram of FIG. 6.

FIG. 10 is a flow diagram showing the "show me" function of multi-modal device 10. The "show me" function is entered via a signal through connector "E", represented by block 322 whereupon the signal proceeds to the "show me" block 330. The operator has the possibility of selecting one of several possible functions represented by block 434, such as a solution function, a score function, or a mathematical tables function. Upon making a selection of one of the three above functions a signal is generated and the operator must determine whether to activate a reset mechanism represented by block 436 or continue on. If the reset mechanism is activated a signal is directed to connector "A", represented by the numeral 310. If reset is not necessary, a signal from the block 436 is passed to a valid selection block 438. In the event an invalid selection is made a signal is directed to an error message block 440 whereupon a signal representing an error message would be produced and passed to connector "E" represented by the block 322. If a valid selection is determined by the block 438 the signal is passed to either a solutions block 442 via connector "P" represented by the block 444, score block 446 via connector "Q" represented by the block 448, or tables block 450 via connector "R" represented by the block 452. For example, if the solution funcion had been selected and the input signal has been determined to be a valid signal, the signal would be passed through the connector "P", i.e. block 444 and from there to the solution block 442. The signal would then proceed to a show solution block 454 where a response would be generated to show the solution to the problem that was being worked on. Upon completion of the "show solution" function the process would proceed to connector "E" represented by the block 322. Similarly, if the "score" function had been chosen the signal would continue from connector "Q", represented by block 448 to the "score" block 446. At that time, the signal would continue to the show score block 456. Upon completion of the score being shown by the multi-modal device 10 a signal continues to connector "E" represented by block 322 for further processing. In like manner if the "tables" block 450 has been selected, a signal would continue to connector "R", represented by the block 452 and continue onto the "tables" block 450. The signal would then pass to block 458 for selection of a proper preprogramed table. A signal representing the proper table would be transmitted to the show table block 460 whereupon the table would be transformed into a form suitable for use and inspection by the operator. Upon completion of the tables being shown, a signal would be transmitted to connector "E", represented by block 322 for the continuation of processing.

The general operation of the multi-modal education and entertainment device 10 will be described hereinbelow. When power is turned on, the multi-modal device 10, through its stored program shows a message on the display prompting the user to choose one of the control functions. For instance, in one form, the following may be the options—define problems, solve problems, spell, play music or play games. If any choice other than those shown above is made, the program provides an error feedback and re-prompts the user for the correct choice.

Assume that "solve" option is selected to solve problems previously defined. The program prompts the user to select one of the following: add, subtract, multiply, divide or spell. Contacting any other pad location prompts an error message.

Now assume that the stylus 18, a non-cognitive element, is moved across the two half pads of the "add" control input pad, thereby selecting the add function. The program now prompts the user for the first "add" problem to be solved. The subject first writes the problem to be solved on the relational pads in the "add" relational section, such as data input pads 46 of the relational section 56. Refering to FIG. 2B, this is done as follows: In the single entry mode, the stylus 18 is first used to mark the digit on the appropriate relational pad, thereby indicating the pad location being marked on, followed immediately by moving the stylus 18 in an electrically contacting position across the two half pads of the appropriate cognition pad (data input) 38 in the non-relational section 44. This procedure informs the logic unit 82 what digit (value) was entered in the previous operation. In the multiple entry mode, several pads in the "add" relational section are written on; then the stylus 18 is moved across the two halves of the pads of the appropriate digit(s) in the data input pad 38 in the non-relational section 44, the same number of times and the same sequence as writing was done in the earlier operation. This process is continued until the problem is solved. At this time the non-relational control input pad "enter" is contacted across the two halves, thereby informing the logic unit 82 that the subject's solution is ready to be scored. The logic unit 82, through its stored program(s), solves the problem and checks the solution against what the subject entered. If it is correct, the program adds 1 to the good score for "add" & adds 1 to the total add problems solved. This is followed by a visual and/or sound display of a "good" message feedback. The process then presents the next "add" problem for solution as before. However, if the solution was in error, a visual and/or sound error message is displayed, and the same problem is presented for retry. However, the program adds 1 to the total attempted for add problems thereby lowering the subject's earned score (percentage) for "add".

The subject may do one or more of the following:

1. By selecting the skip control function, request that the present problem be skipped and be presented with the next problem.

2. By selecting the "score" control function, request the score to be displayed up to this point.

3. By selecting the "prompt" control function, the program checks the validity of the problem as it is being solved; providing a visual and/or sound feedback when an error is detected.

4. By activating the "Show Me" pad followed by the "Answer" pad, the solution to the problem is displayed. Once the "Answer" is selected, the process can be such that the subject cannot get a score on that problem.

The process herein above described shows problems maybe solved by means of the "add" mode as an illustration. The process is similar for subtract, multiply and divide.

When the "solve" control function is followed by the "spell" control function, the logic unit 82 picks the first word defined for spelling, and through the voice synthesizer, converts it to sound impulses. The subject then spells the words by writing on the "spelling" pads 54 in the relational section 64 followed by moving the writing medium across the two halves of the data input pads 38 in the non-relational section 44 in the same sequence as in which the letters were written on the spelling pads. When the spelling has been accomplished, the "enter" control function is selected. As in the case of math, the logic unit 82 checks what was entered against the defined word for correctness and scoring.

The multi-modal device 10 has provisions for defining problems through itself, apart from the master computer 12. This feature gives the parent/guardian of a child the option to define problems more suited to the needs of a child. Problem definitions are eaily accomplished as follows:

First the stylus 18 is contactingly moved across the two halves of the input pad labelled "define" to select the define mode.

Assume that the following two numbers are required to be added: 427+608. The stylus 18 is contactually moved across the two halves of the data input pads 38 in the non-relational section 44 labeled with the digits and symbols in the same sequence as the sequence shown. The process is terminated by activiting the "enter" pad, which signals the logic unit 82 to store the defined problem for future retrieval and use. This is very easily and simply accomplished.

The method of defining other types of problems i.e. subtract, multiply and divide, is similar to that for the "add" mode. These are simply done by writing the problems as a string with the operator (+, −, ×, ÷) imbedded within the string as shown herein above for "add" and entered as described for "add". The logic unit 82 stores the problem defined in its memory unit 22 for future use. The defining of words for spelling is accomplished in a similar manner. However, after choosing the "define" control option, the "spell" control option may be selected to inform the logic unit 82 that spelling words are to be defined.

In a similar fashion, musical scores may be defined. The note to be played followed by the time duration are written as a string. The define control function is first chosen, followed by the "music" control function. The stylus 18 is then moved across the appropriate data input pads 38 in the non-relation section 44 in the same sequence as the string established. The logic unit 82 then stores these values in its memory unit 84 for future retrieval for producing the tune.

The multi-modal device 10 also has provisions for a child to play games. This is done by selecting the game option followed by the game control functions. The logic unit 82 is programmed to prompt one or more subjects through the games. These may be, for instance, playing word guessing games, number guessing games, tic-tac-toe etc.

The function of one other set of pads needs to be described. These are two vertical sets of pads 36 comprising the non-relational section 42. These are provided as a means to have feedback for verification purposes. For instance, when solving an add problem, activating the pad marked 14/15 displays the carry digits stored in the memory unit 84 which can be visually verified against what is written on the carry pads. Any discrepancy noted can then be corrected. Two vertical rows are provided because of the fact that only eight display characters are displayed at a time in the embodiment shown. Activating one of the "left display pads" 36 will display up to eight characters/numbers in the same row to the right of it; activating one of the "right display pads" 36 will display up to eight characters/numbers in the same row to the left of it.

Tests and homework assignments in a classroom situation using the present invention are carried out as follows. The teacher defines the problems or assignments to be worked on by the children in the master computer 12. Through predefined communication procedures between the master computer 12 and the multimodal devices 10 or 210 connected to it through buss 14, the problems or assignments are "shipped down" to the individual multi-modal devices 10 or 210 where they are stored in the memory unit 84 (shown in FIGS. 3). Each child is then able to retrieve and solve the problems as previously defined.

In the event the children are being tested, at the expiration of the appropriate length of time, the teacher can "pull in" the test scores from each of the multi-modal devices 10 or 210 into the master computer 12 for tabulation and storage.

In the event the children are solving home-work problems, the problems "shipped down" to the multi-modal devices 10 or 210 from the master computer 12 are stored in the memory portion of the memory unit 84. At the end of the day, the children disconnect buss 14 from the multi-modal devices 10 or 210, carry it home and solve the assignments. The next day, when the multi-modal devices 10 or 210 are connected to buss 14 and thereby to the master computer 12, the score for each child can be "pulled in" as before.

The above process reduces the time required by teachers to do routine chores of grading papers and other time consuming book keeping tasks. This will free up time on the part of teachers that may be fruitfully used for providing personal attention to children that need help.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed and as defined in the following claims.

What is claimed is:

1. An improved process for information input using electromechanical, storage, control, comparison, retrieval and output devices comprising the steps of:

inputting a first input signal to a logic means representing control and predefined data information; and inputting a second input signal to the logic means representing location indication information, such that the logic means can proceed in accordance with a predesignated program of operations, said inputting of second input signal comprising the steps of contacting a stylus in indicia marking engagement with a relational input pad means, activating the pad location and providing input signals to the logic means as to the location where marking is accomplished, the marking being indicative of the indicia of the data being input, followed by the stylus being brought into activating engagement with a non-relational data input pad means corresponding to the previously marked indicia, thereby providing input to the logic means corresponding to the indicia marked on the relational pad.

2. The process of claim 1 wherein the logic means is operably connected to a memory means having at least one storage device therewith, and wherein in second input signal has alphanumeric information having mathematical control indicia into the storage device of the memory means.

3. The process of claim 2 wherein the logic means is operably connected to a master computer and the process further comprises:

inputting alphanumeric information to a plurality of storage devices within a memory means;

inputting control information to a plurality of storage devices within the memory means;

inputting programs, data or control information from a master computer; and selecting and processing of one or more major functions contained within the program.

4. An improved process for information input using electromechanical, storage, control, comparison, retrieval and output devices comprising the steps of:

inputting a first input signal to a logic means representing control and predefined data information; and inputting a second input signal to the logic means representing location indication information such that the logic means can proceed in accordance with a predesignated program of operations, said second input signal produced by a cognitive process comprising:

engaging a stylus means in indicia marking engagement with a relational data input pad means;

marking a desire indicia;

providing input to the logic means corresponding to the pad location where marking is accomplished;

transmitting indicia signals produced thereby to logic means; and activating an activate control pad which directs the logic means to decipher the signals produced by the stylus means so that the logic means deciphers and provides feedback information on the indicia recognized, the stylus being capable of activating engagement with a non-relational data input pad means corresponding to the previously marked indicia to provide a correct data input into the logic means when non-recognition of the mark indicia occurs.

* * * * *

UNITED STATES PATENT AND TRADEMARK OFFICE
CERTIFICATE OF CORRECTION

PATENT NO. : 4,668,194
DATED : May 26, 1987
INVENTOR(S) : Sarukkai R. Narayanan

It is certified that error appears in the above-identified patent and that said Letters Patent is hereby corrected as shown below:

In column 5, line 27, the word "aand" should read --and--. In column 7, line 45, the word "systme" should read --system--. In column 7, line 46, the word "preprogramd" should read --preprogramed--. In column 8, line 12, the words "thedesired" should read --the desired--. In column 8, line 59, the word "forminfg" should read --forming--. In column 9, line 16, the word "depnding" should read --depending--. In column 9, line 59 the word "indicatinfg" should read --indicating--. In column 9, lines 62 and 63, the word "appropriat" should read --appropriate--. In column 10, line 26, the word "shwon" should read --shown--. In column 14, line 12, the word "dicision" should read --decision--. In claim 4, column 19, line 16, the word "desire" should read --desired--.

Signed and Sealed this

Twenty-seventh Day of June, 1989

*Attest:*

DONALD J. QUIGG

*Attesting Officer*  *Commissioner of Patents and Trademarks*